Nov. 16, 1926.

G. J. LA MAY 1,606,948

GEAR SHIFT

Filed March 21, 1925    2 Sheets-Sheet 2

G. J. LaMay — INVENTOR

BY *Victor J. Evans*

ATTORNEY

Patented Nov. 16, 1926.

1,606,948

UNITED STATES PATENT OFFICE.

GEORGE J. LA MAY, OF DETROIT, MICHIGAN.

GEAR SHIFT.

Application filed March 21, 1925. Serial No. 17,296.

My present invention has reference to a gear shift mechanism for automobile or similar engines where a change of speed is desired or necessary.

The object of this invention is to simplify and improve the existing art by producing a mechanism operated by the swinging of a lever in a longitudinal plane, either forwardly or rearwardly, for actuating means for locking gears in intermeshing engagement, and whereby three forward speeds and a reverse speed may be imparted to the engine.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1:
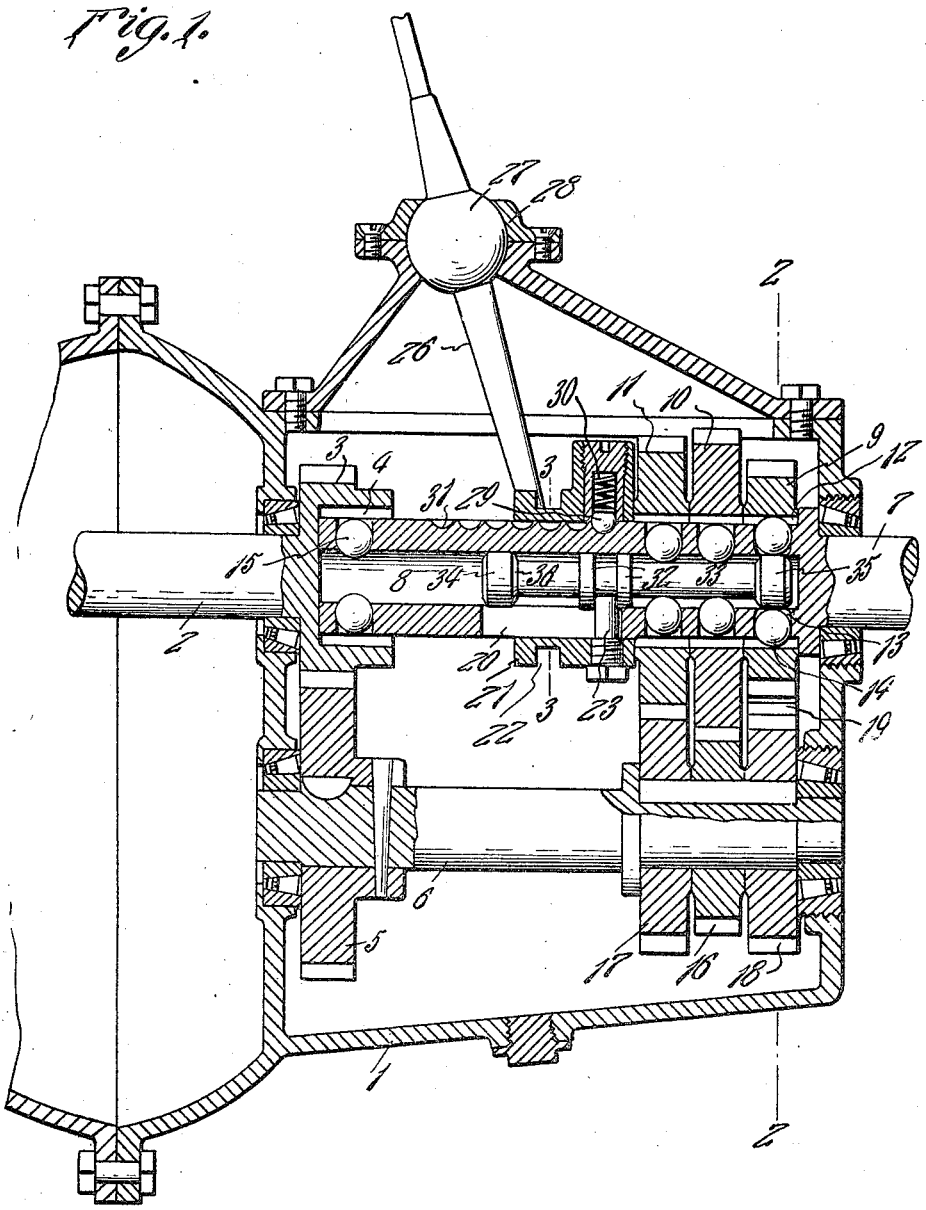
Figure 1 is an approximately central vertical longitudinal sectional view through the transmission casing of an automobile, or like engine, to illustrate my improvement and the latter being in section.
Figure 2:
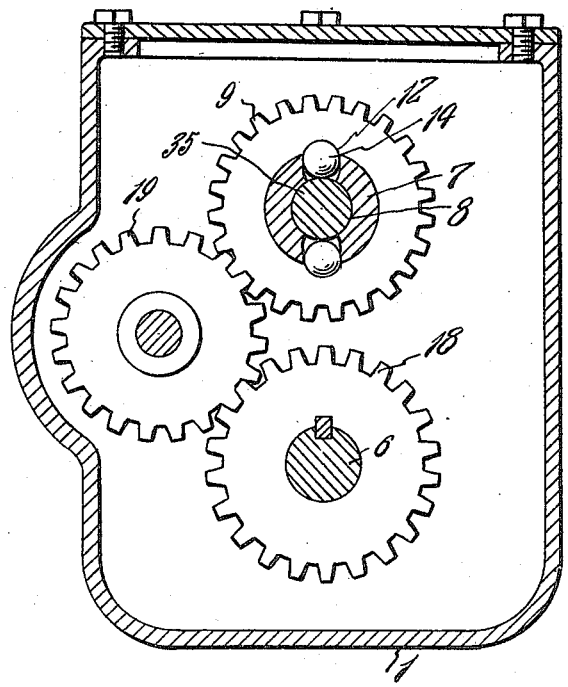
Figure 2 is a sectional view on line 2—2 of Figure 1, looking in the direction of the arrows.
Figure 3:
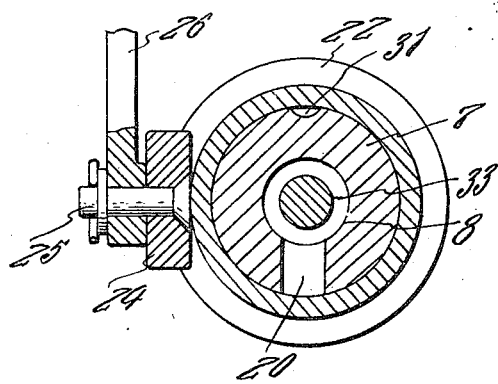
Figure 3 is a detail sectional view approximately on the line 3—3 of Figure 1.

In the drawings the transmission case for the engine of an automobile or the like is indicated by the numeral 1. The engine shaft is indicated by the numeral 2, the same having its end received in the transmission case 1 provided with a gear 3, and the outer face of this gear is formed with a round pocket, the wall provided thereby being formed with two longitudinally disposed notches 4. The gear 3 is in mesh with a larger gear 5 secured on a counter shaft 6 whose ends are journaled in roller bearings in the transmission case 1. The engine shaft 2 is also journaled in roller bearings.

The transmission shaft is indicated by the numeral 7, journaled in roller bearings in the case 1, and has the portion thereof received in the said case formed with a longitudinal bore 8. On the hollow portion of the transmission shaft 7 there are arranged gears 9, 10 and 11, respectively. These gears have their bores formed with oppositely arranged depressions 12, respectively, while the hollow portion of the shaft 7, in alignment with the said depressions, is formed with pockets 13, respectively, for the reception of balls 14 respectively. Other balls 15, are pocketed in the hollow portion of the shaft 7 and are disposed opposite the notches 4 in the gear 3. All of the balls, incident to the weight thereof, normally gravitate partly into the bore 8 of the transmission shaft 7.

Keyed on the counter shaft 6 and in direct mesh with the gears 10 and 11 there are gears 16 and 17, respectively. There is also keyed on said counter shaft another gear 18 which meshes with an idler 19 which in turn meshes with a gear 9.

The hollow portion of the transmission shaft 7 is formed with a somewhat elongated slot 20 that communicates with its bore 8 and arranged over and partly closing the said slot 20 there is an annular member 21. The member 21 has its inner end reduced, and formed with an annular slot 22. The thickened portion of the member 21 has screwed therein a lug 23 that is received in and contacts with the side walls of the notch 20. Received in the depressed portion or groove 22 of the member 21 there is a roller 24 which is pivotally secured, as at 25, to a lever 26. The lever has a ball enlargement 27 that is journaled in a bearing socket 28 on the top of the transmission case 1.

In the enlarged portion of the member 21 there is a ball 29 which is influenced towards the hollow portion of the shaft 7 by a spring 30. The ball 29 is designed to be received in any one of equidistantly spaced cup-shaped depressions 31 in the periphery of the shaft 7.

The pin 23 is arranged between spaced plungers 32 on a rod 33 disposed for slidable engagement with the bore 8 of the shaft 7. The rod 33 has its opposite ends formed with heads 34 and 35, respectively, the same being round in plan and snugly fitting the wall provided by the bore 8. The heads 34 and 35 have their edges flanged inwardly, as at 36.

When the parts are arranged as disclosed in Figure 1 of the drawings the lever 26 has been thrown in a forward direction, causing the annular member 21 to be moved longitudinally on the transmission shaft 7, bringing its spring influenced catch, that is the ball 29, in one of the pockets 31. As the member 21 is associated with the rod 33, the latter will have been moved longitudinally so that its head 35 will be brought opposite and into engagement with the locking elements in the nature of the balls 14 to force the same through their pockets into the depressions 12 in the gear 9. The turning of the engine shaft 2 imparts a like movement to the counter shaft 6 and through the inter-engagement of the gears 18, 19 and 9 a reverse movement will be imparted to the transmission shaft 7. When the engine is to be thrown into first speed the lever 26 is swung in a reverse direction, to bring its locking element 29 into the second pocket 31 from that just occupied. If the locking element 29 was permitted to fall into the pocket next to that just occupied the head 35 would be moved to arrange the same between two of the balls 14, so the gears would be in neutral position. By swinging the lever as above stated, the head 35 will engage with the balls 14 to move the same out of their pockets and into the notches or depressions 12 in the gear 10, thus locking the gear 10 to the gear 16. A swinging of the lever in the same direction will bring the head 35 between two of the balls 14 so that the gears are again in neutral position. Then by swinging the lever to bring the locking element 29 into the next pocket 31 the head 35 will have been moved to force the balls 14 into the notches or depressions 12 of the gear 11. This locks the gear 11 to the gear 17 and the transmission shaft will run at second speed. When the lever 26 is further swung so that the locking element 29 is brought into the pocket 31 nearest the gear 3 the head 34 will be brought against the balls 15, forcing the same into the depressions or pockets 4 in the said gear 3, thereby locking the transmission shaft 7 directly to the engine shaft 2, and causing the transmission shaft to turn in the same direction and at the same speed as that of the engine shaft.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A transmission for automobiles and like engines, including an engine shaft having a hollow gear at one end thereof, a transmission shaft having a hollow portion whose end is received in the gear, other gears freely mounted on the transmission shaft, elements movable through the transmission shaft disposed opposite and designed for inner engagement with the mentioned gears when influenced toward said gears, a slidable rod movable in the hollow portion of a transmission shaft having a head at each end, the edges of said heads being flanged inwardly whereby to engage the elements movable through the transmission shaft, a slidable member upon the hollow portion of the transmission shaft, a plurality of aligned pockets formed on the exterior of the transmission shaft, a spring pressed ball carried by the slidable member for engagement within any of said pockets, means forming connection between the slidable member and the rod, and a lever for imparting movement to said slidable member whereby to actuate said rod and influence the movable elements to locking position, and a counter shaft and fixed gears thereon meshing with the aforementioned gears.

In testimony whereof I affix my signature.

GEORGE J. LA MAY.